US006047389A

United States Patent [19]
Thai

[11] Patent Number: 6,047,389
[45] Date of Patent: Apr. 4, 2000

[54] TESTING OF A SOFTWARE APPLICATION RESIDING ON A HARDWARE COMPONENT

[75] Inventor: Victor M. Thai, Dallas, Tex.

[73] Assignee: Alcatel USA Sourcing, L.P., Plano, Tex.

[21] Appl. No.: 08/940,637

[22] Filed: Sep. 30, 1997

[51] Int. Cl.[7] .................................................. H04L 29/14
[52] U.S. Cl. ............................................................ 714/38
[58] Field of Search ..................... 714/38, 37; 395/710, 395/704, 500.05; 702/119, 123, 58, 59, 120, 182, 183, 184, 185; 364/468.15; 710/15

[56] References Cited

U.S. PATENT DOCUMENTS

| | | | |
|---|---|---|---|
| 5,021,997 | 6/1991 | Archie et al. ........................... 364/900 |
| 5,319,645 | 6/1994 | Bassi et al. ............................... 371/19 |
| 5,381,417 | 1/1995 | Loopik et al. .......................... 371/15.1 |
| 5,438,528 | 8/1995 | Emerson et al. ........................ 364/580 |
| 5,596,714 | 1/1997 | Connell ............................... 395/183.14 |
| 5,600,789 | 2/1997 | Parker et al. ....................... 395/183.14 |
| 5,657,438 | 8/1997 | Wygodny et al. ...................... 395/180 |
| 5,669,000 | 9/1997 | Jessen et al. ............................ 395/704 |
| 5,694,540 | 12/1997 | Humelsine et al. ................ 395/183.14 |
| 5,724,273 | 3/1998 | Desgrousilliers et al. .............. 364/580 |
| 5,737,517 | 4/1998 | Kite et al. ........................... 395/183.14 |
| 5,745,675 | 4/1998 | Herbig et al. ....................... 395/183.14 |
| 5,754,760 | 5/1998 | Warfield ............................. 395/183.14 |
| 5,781,720 | 7/1998 | Parker et al. ....................... 395/183.14 |
| 5,905,856 | 5/1999 | Ottensooser ........................ 395/183.14 |

OTHER PUBLICATIONS

Hanson et al., "A Simple and Extensible Graphical Debugger" USENIX, pp. 174–183, Jan. 1997.

Korn et al., "DEET, A Simple and Extensible Graphical Debugger" http://www.cs.princeton.edu/~jlk/deet, pp 1–21, Jan. 1997.

*Primary Examiner*—Robert W. Beausoliel, Jr.
*Assistant Examiner*—Stephen E. Elmore
*Attorney, Agent, or Firm*—Baker Botts L.L.P.

[57] ABSTRACT

According to the system and method, at least one test script is provided for testing a function of the software application. A testing interface, loaded into the hardware component, is operable to input the test script into the software application. A dispatch may be in communication with the testing interface. The dispatch receives a command from a user and, in response, invokes the input of the test script into the software application using the testing interface.

20 Claims, 5 Drawing Sheets

6,047,389

TESTING OF A SOFTWARE APPLICATION RESIDING ON A HARDWARE COMPONENT

TECHNICAL FIELD OF THE INVENTION

The present invention relates generally to the field of testing, and more particularly to testing of a software application residing on a hardware component.

BACKGROUND OF THE INVENTION

In some computing implementations, a software package or application may be designed to reside and operate on a corresponding hardware component; for example, software may be programmed into a hardware card in order to provide functionality for that card. It is desirable that the operation of such a software application be tested on the hardware component before the combination is placed into actual use. Previously, such testing was problematic for various reasons. In many cases, the target hardware component did not provide any interface for a human user to interact with the software application to be tested; accordingly, it was difficult to monitor, observe, or control testing as the testing progressed. Furthermore, although some systems were previously developed to test the operation of a software application resident on a hardware component, these prior systems were inadequate in many ways. For example, in the prior systems, an entire series of tests had to be run each time that any aspect of a software application's operation was required to be tested. Because a user could not selectively test particular aspects of operation, the time and operation of both the user and the testing system were undesirably consumed. In addition, these prior systems did not provide any information to a user as testing progressed, but rather only output information at the end of testing.

SUMMARY OF THE INVENTION

In accordance with the present invention, the disadvantages and problems associated with testing a software application residing on a hardware component have been substantially reduced or eliminated.

In one aspect of the present invention, a system is provided for testing a software application residing on a hardware component. The system includes at least one test command for testing a function of the software application. A testing interface, loaded into the hardware component, is operable to input the test script into the software application. A dispatch may be in communication with the testing interface. The dispatch receives a command from a user and, in response, invokes the input of the test script into the software application using the testing interface.

In another aspect of the present invention, a testing interface is provided for testing a software application residing on a hardware component. The testing interface is loaded into the hardware component and includes an internal command module, a test developer command module, and a command parser module. The internal command module is operable to process an internal command. The test developer command module is operable to process a test developer command. The command parser module is coupled to the internal command module and the test developer command module. The command parser module receives a command from a user, determines whether the command is either an internal command or a test developer command, and parses the command to either the internal command module or the test developer command module for processing.

In yet another aspect of the present invention, a method is provided for testing a software application residing on a hardware component. The method includes the following steps: receiving a command from a user at a dispatch residing on a computer coupled to the hardware component; transmitting the command to a testing interface which has been loaded into the hardware component; and in response to the command, invoking the input of a test script into the software application, the test script for testing a function of the software application.

Important technical advantages of the present invention include allowing a user to selectively test different aspects of a software application residing on a hardware component. This is accomplished by loading a plurality of test scripts into the hardware component. Each test script is operable to test one or more particular aspects of the software application's function. A testing interface may also be loaded into the hardware component. The testing interface allows a user to selectively invoke the test scripts for input into the software application.

Another technical advantage of the present invention includes presenting a user with various information as testing progresses for a software application that resides on a hardware component. In particular, a dispatch may operate on a computer coupled to the hardware component. The dispatch communicates with a testing interface that has been loaded into the hardware component. As the software application is being tested, it will generate test results. The testing interface relays these test results to the dispatch where they are then presented to a user.

Other important technical advantages are readily apparent to one skilled in the art from the following figures, description, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
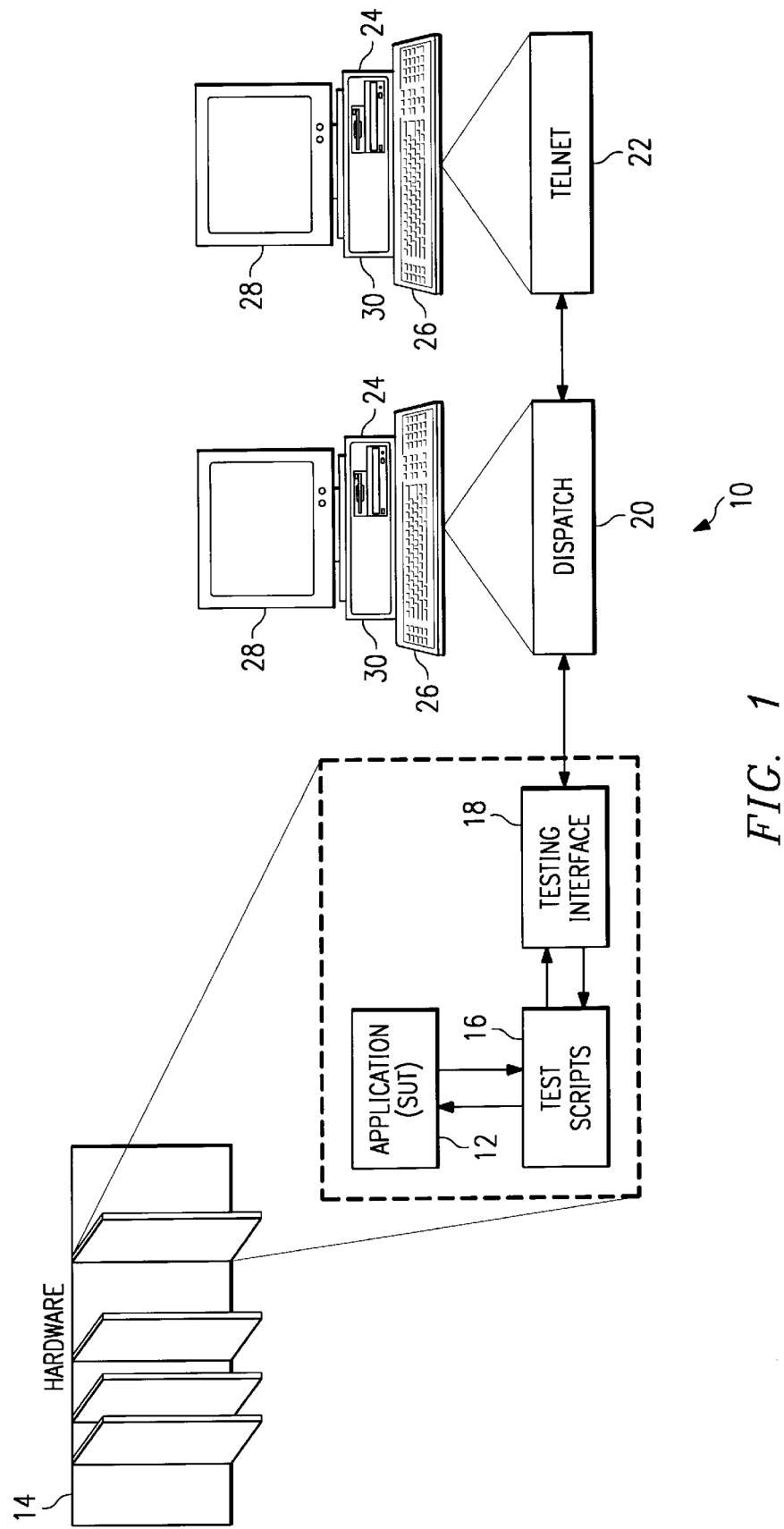
FIG. 1 illustrates a system for testing a software application residing on a hardware component, in accordance with an embodiment of the present invention.

The preferred embodiment of the present invention and its advantages are best understood by referring to FIGS. 1–5 of the drawings, like numerals used for like and corresponding parts of the various drawings.

Turning first to the nomenclature of the specification, the detailed description which follows is represented largely in terms of processes and symbolic representations of operations by conventional computer components, such as a central processing unit ("CPU") or processor associated with a general purpose computer system, memory storage devices for the processor, and connected pixel-oriented display devices. These operations include the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, texts, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, or the like, which are often associated with manual operations performed by a human operator. It must be understood that no involvement of the human operator may be necessary, or even desirable, in the present invention. The operations described herein are machine operations performed in conjunction with the human operator or user that interacts with the computer or computers.

In addition, it should be understood that the programs, processes, methods, and the like, described herein are but an example of one implementation of the present invention and are not related or limited to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hardwired logic or programs stored in non-volatile memory, such as read only memory (ROM).

Referring now to the drawings, FIG. 1 illustrates a system 10 for testing a software application 12 which may reside on a hardware component 14, in accordance with an embodiment of the present invention. Hardware component 14 can be any one or a combination of hardware elements, such as, for example, a line card which forms a part of a larger computing system. Importantly, hardware component 14 may not comprise any interface, such as a combination of input/output devices, which provides direct interaction with a user. Software application 12, also referred to as software under test (SUT), may comprise any one or a combination of programs, routines, processes, methods, etc., which may be run on hardware component 14 to perform or support one or more functions. Software application 12 may be implemented as computer code which is stored in a suitable memory of hardware component 14. Testing system 10 generally functions to test the operation of application 12 on hardware component 14. More specifically, as explained herein, testing system 10 allows a user to interface with software application 12, selectively test various functions of the software application 12 as it operates on hardware component 14, and to view the results of testing as it progresses. As shown, testing system 10 may comprise a plurality of test scripts 16, a testing interface 18, a dispatch 20, and a telnet 22.

Test scripts 16 comprise various testing commands, routines, cases, or patterns that can be input into software application 12 to test the application's operation. In one embodiment, each test script 16 may be provided to test a particular function or group of functions of software application 12. Generally, when invoked, each test script is fed into software application 12 which, in response, may return various results. Test scripts 16 can be loaded into hardware component 14 for the purposes of testing. For example, test scripts 16 may be stored or reside within the same memory which contains software application 12. The test scripts can be implemented as test information or data.

Testing interface 18 generally supports interactive and/or automated testing of application 12 residing on hardware component 14. For example, testing interface 18 allows a user to invoke a desired test script 16 to test a corresponding function of software application 12 and also allows immediate visual verification of such testing. The automated testing supported by testing interface 18 saves time and provides a regression test which may be achieved by use of a script command invocation. Testing interface 18 may be implemented as software code or a software code module that is linked to or in communication with test scripts 16. Like test scripts 16, testing interface 18 may be loaded into hardware component 14 for the purposes of testing. Testing interface 18 can reside in the same memory containing software application 12. In one embodiment, testing interface 18 may be a command/response type program, which is inserted into application 12 at the point just after the application's initialization so that testing interface 18 may take control before application 12 begins its own operation. An exemplary embodiment of testing interface 18 is illustrated and described below in more detail with reference to FIG. 2.

Dispatch 20 is in communication with testing interface 18 and may comprise a program which resides on a computer 24. Dispatch 20 supports interaction between testing interface 18 and a user. For example, a user may issue commands to testing interface 18 by typing the commands into computer 24 on which dispatch 20 resides. Dispatch 20 is operable to present command prompts and test results that are returned by testing interface 18 in response to various commands. Dispatch 20 also supports remote access to testing interface 18. Like testing interface 18, dispatch 20 may be a command/response type of program. Upon initialization, dispatch 20 may connect to testing interface 18 via an appropriate network, after which dispatch 20 waits for the occurrence of any one of various events, such as a standard input event, a telnet input event, a script file input event, or a testing interface input event; these events are described below in more detail. An exemplary embodiment of dispatch 20 is shown and described in more detail with reference to FIG. 3.

Telnet 22 may be a command/response type program residing on a computer 24 which is remote from hardware component 14 and software application 12. Telnet 22 may be operable to communicate with testing interface 18 via dispatch 20. For this purpose, telnet 22 may be operable to send one or more commands to dispatch 20 in order to initiate connection to testing interface 18. Telnet 22 allows a user to test software application 12 from a remote location. Telnet 22 may provide or support many of the same functions as dispatch 20, previously described.

The associated computers 24 maintain and execute the instructions to operate dispatch 20 and telnet 22. Each computer 24 includes an input device 26 such as a keypad, touch screen, or other device that can accept information. An output device 28 conveys information associated with the operation of dispatch 20 or telnet 22, including digital data, visual information, or audio information. Both input device 26 and output device 28 may include fixed or removable storage media, such as magnetic computer disk, optical disk, CD-ROM, or other suitable media to both receive output from and provide input to dispatch 20 or telnet 22. One or more processors 30 and their associated memories execute instructions and manipulate information in accordance with the operation of dispatch 20/telnet 22 described herein.

In operation, test script 16 and testing interface 18 may be loaded onto hardware component 14 for testing the resident software application 12. A user may interact with testing interface 18 using dispatch 20 or telnet 22 in order to invoke test scripts 16. Upon invocation, each test script 16 is input into application 12 to test a particular function or group of functions. Software application 12, in response, outputs various test results. Testing interface 18 returns these test results to dispatch 20. Dispatch 20 may then present the results to a user and/or relay the test results to telnet 22 for presentation at a remote site. Accordingly, the present invention allows a user to call specific test scripts 16 for testing particular functions of application 12. The user is able to monitor or track testing as it progresses via dispatch 20 or telnet 22.

Figure 2:
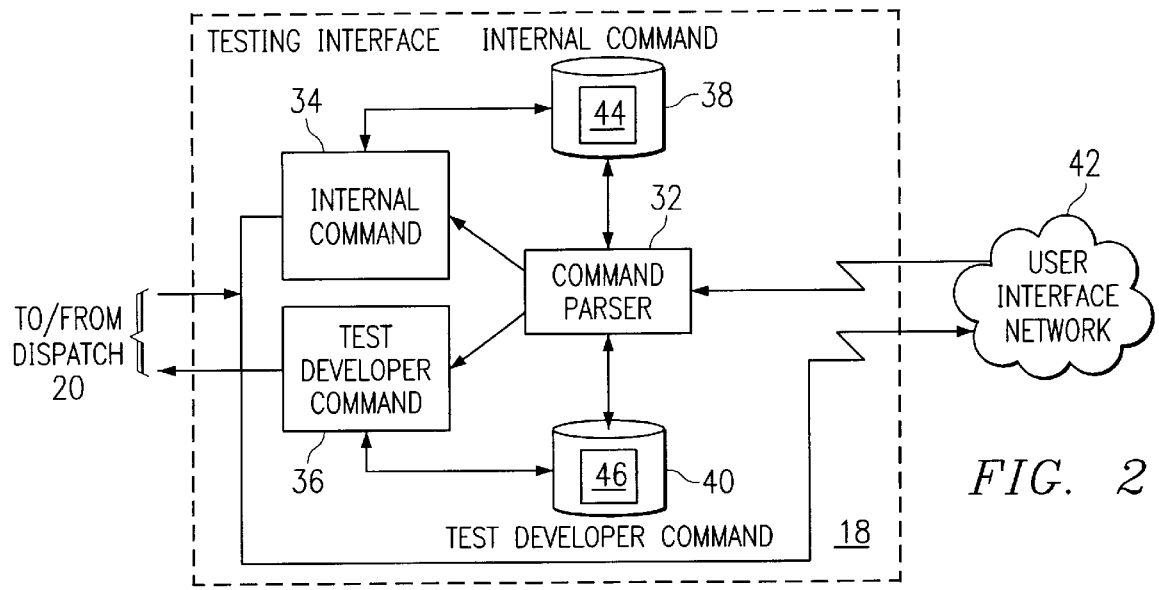
FIG. 2 illustrates an exemplary embodiment for a testing interface, in accordance with the present invention.

FIG. 2 illustrates an exemplary embodiment for testing interface 18, in accordance with the present invention. As previously discussed, testing interface 18 supports interactive and/or automated testing of a software application 12 residing on a hardware component 14. Testing interface 18 may comprise a command parser module 32, and internal command module 34, a test developer command module 36, an internal command memory 38, and a test developer command memory 40.

Internal command memory 38 and test developer command memory 40 may reside in the same or separate suitable storage media, such as random access memory (RAM), read-only memory (ROM), disk, tape storage, or other suitable volatile or non-volatile memory. Each of these memories can be a relational database. Internal command memory 38 and test developer command memory 40 each function to store, forward, or retrieve information relating to various commands that may be received by testing interface 18 via a user interface network 42.

In particular, internal command memory 38 contains internal command information 44. Internal command information 44 comprises information relating to various system commands internal to testing interface 18. These internal commands may be associated with the setting or resetting of various flags within testing interface 18. Exemplary flags may include an echo flag, a last_result flag, a test_result, a capture flag, a validation flag, a stop_on_fail (SOF) flag, and a quit flag. The echo flag comprises an "on/off" flag; if this flag is set to "on," testing interface 18 returns a command prompt to a user via dispatch 20 to indicate that testing interface 18 is ready for another command. The last_result flag indicates the result of the last test executed; this result can be in one of the following states: "pass," "fail," "abort," or "syntax." The states of "pass," "fail," and "abort" indicate that the result of the last test passed, failed, or was aborted, respectively. The "syntax" state indicates that the last command submitted to testing interface 18 was not recognized. The test_result flag indicates the overall test results for a plurality of test associated test commands. The test_result flag may be in any of the states described for the last_result flag. The information conveyed by the last_result and test_result flags may be sent out of testing interface 18 for presentation to a user at dispatch 20. The capture flag is an "on/off" flag which can be set by a user; if the capture flag is set to "on," testing interface 18 sends a signal to dispatch 20 to turn on/off a recorder at dispatch 20 before test result information is sent out. The validation flag is an "on/off" flag which is used to validate a test command function developed by a user; if the validation flag is set to "on," a validation message will be displayed for each command. The SOF flag is an "on/off" flag which can be used by test developer to stop a test from executing further when a fail signal is encountered. The quit flag is used to terminate or quit out of the testing interface 18 program. It should be understood that in alternate embodiments, internal command information 44 may comprise information relating to other flags in addition to, or instead of, the exemplary flags described herein. Internal command information 44 may be maintained within internal command memory 38 in the form of one or more relational tables.

Test developer command memory 40 contains test developer command information 46, which generally comprises information relating to various commands that may be received from a user (specifically, a test developer). For example, these test developer commands may cause the invocation of test scripts 16, which are input into software application 12. Like internal command information 44, test developer command information 46 may be maintained in the form of one or more relational tables.

Command parser module 32 is coupled to internal command memory 38 and test developer command memory 40 and, accordingly, may access internal command information 44 and test developer command information 46 contained therein. Command parser module 32 may be in communication with dispatch 20 via user interface network 42. Command parser module 32 is operable to receive one or more commands over user interface network 42. Command parser module 32 parses or distributes each command which it receives. In particular, command parser module 32 may analyze the received commands and forward these commands to either internal command module 34 or test developer command module 36 so that the commands may be further processed. In one embodiment, an interpreter in command parser module 32 may search the relational tables contained in internal command memory 38 and test developer command memory 40 against an incoming command.

Internal command module 34 is coupled to command parser module 32 and internal command memory 38. Internal command module 34 receives internal commands parsed out by command parser module 32. Internal command module 34 is operable to interpret these internal commands and can invoke an appropriate function to process each internal command that it receives. In this way, the various flags associated with internal command information 44 can be set so that operation within testing interface 18 may proceed accordingly.

Test developer command module 36 is coupled to command parser module 32 and test developer command memory 40. Test developer command module 36 receives test developer commands parsed out by command parser module 32. Test developer command module 36 is operable to invoke an appropriate test developer command function in response to each test developer command which it receives. Each test developer command function may, for example, cause one more test scripts 16 to be input into software application 12; in response, application 12 may return various test results which testing interface 18 can relay to a user via user network interface 42.

The functionality of each of command parser module 32, internal command module 34, and test developer command module 36, as described herein, may be performed by the same or separate processor, such as a main frame, a file server, a workstation, or other suitable data processing facility running appropriate software.

A flow chart for a method corresponding to an exemplary operation of testing interface 18 is illustrated and described below with reference to FIG. 4.

Figure 3:
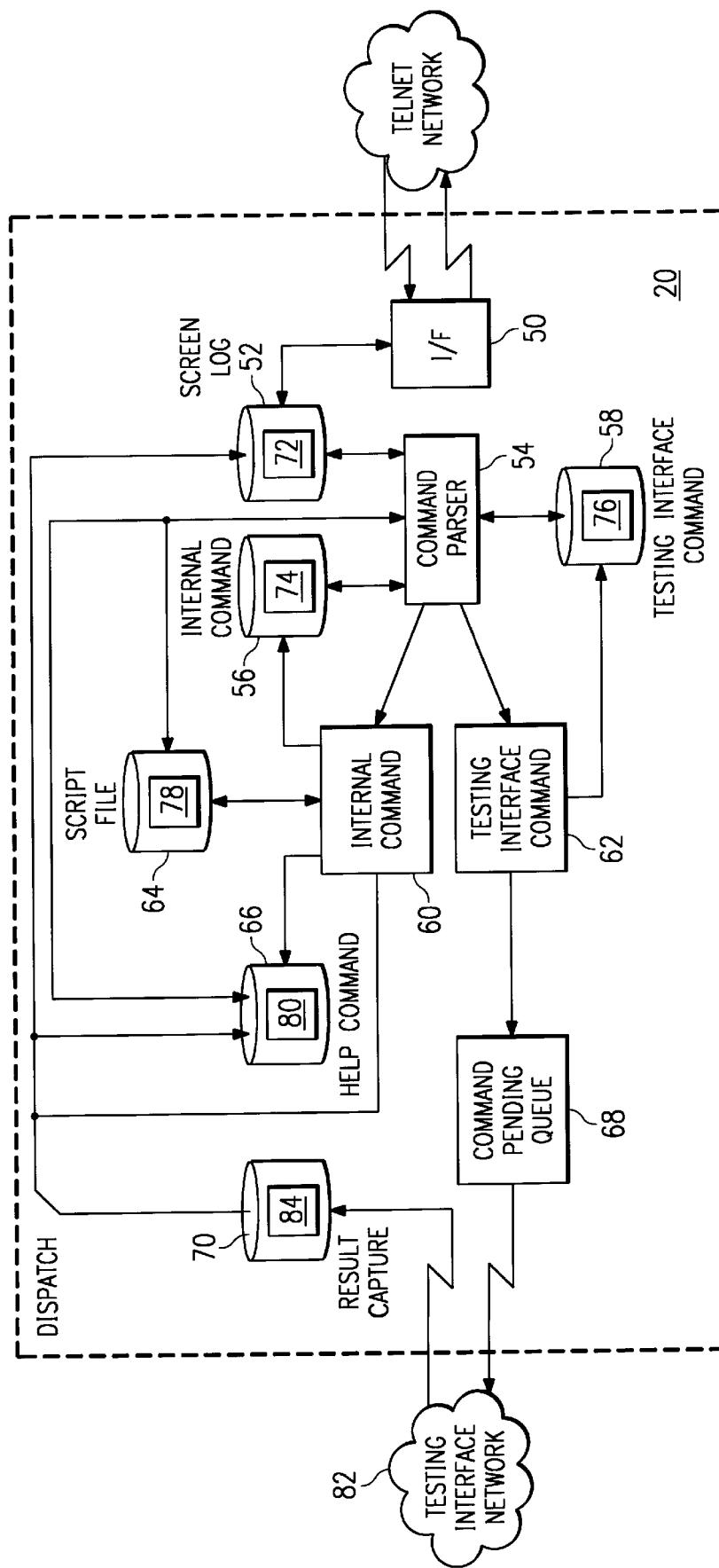
FIG. 3 illustrates an exemplary embodiment for a dispatch, in accordance with the present invention.

FIG. 3 illustrates an exemplary embodiment for dispatch 20, in accordance with the present invention. As previously described, dispatch 20 may comprise a program residing on a computer 24 which allows a user to interact with testing interface 18 to test software application 12. Dispatch 20 supports communication between telnet 22 and testing interface 18. Dispatch 20 may include an interface (I/F) 50, a screen log memory 52, a command parser module 54, an internal command memory 56, a testing interface command memory 58, an internal command module 60, a testing interface command module 62, a script file memory 64, a help command memory 66, a command pending queue 68, and a result capture memory 70.

Interface 50 allows a user to interact with testing system 10, and in particular dispatch 20. The functionality of interface 50 may be supported by one or more suitable input devices, such as a key pad, touch screen, or other suitable device that can accept information, and one or more suitable output devices, such as a computer display, for conveying information associated with the operation of testing system 10. Interface 50 may receive commands or script files from a user operating on computer 24 on which dispatch 20 resides.

Screen log memory 52 is coupled to interface 50. Screen log memory 52 functions to receive, store, and forward screen log information 72. Screen log information 72 comprises various information which may appear on a display or screen associated with interface 50. This information may include information relating to commands or script files received from a user at interface 50, results output by application 12 in response to test scripts invoked by such commands or script files, and any other suitable information. Screen log memory 52 can reside in a suitable storage media, such as RAM, ROM, disk, tape storage, or other suitable volatile or non-volatile memory.

Internal command memory 60, testing interface command memory 62, script file memory 64, and help command memory 66 may reside in the same or separate storage media as screen log memory 52. These memories 60, 62, 64, and 66 function to receive, store, and forward information relating to various commands or scripts that may be received by, generated within, and/or transmitted out of dispatch 20.

Specifically, internal command memory stores internal command information 74. Internal command information 74 comprises various information relating to commands which are internal or local to dispatch 20. At least a portion of these internal commands may be related to various, corresponding flags which are set or reset during the operation of dispatch 20. Exemplary flags may include an echo flag, a last_result flag, a time flag, a log_name flag, cap_name flag, a help flag, a testing_interface flag, a chat flag, an abort flag, a telnet flag, and a stop_on_fail (SOF) flag, and a quit flag. The echo flag is an "on/off" flag which may be set by a user so that dispatch 20 returns a message to indicate, for example, that dispatch 20 will only accept internal commands at the present time. The last_result flag comprises a flag set by the execution of various commands in dispatch 20; the last_result flag may be used to determine whether the execution of a script command should be terminated. The last-result flag can be in one of the following states: "pass," "fail," "abort," or "syntax." The time flag is an "on/off" flag which can be set by a user; if set, dispatch 20 will append a time stamp to each command appearing in a test result capture file (described below). The log_name flag comprises a flag which allows a user to specify a file name for information appearing in screen log memory 52. The cap_name flag allows a user to specify a name for a result capture file. The help flag is associated with an on-line help facility supported by help memory 66; if set, the help flag causes the contents of help memory 66 to be presented to a user. The testing_interface flag reports the current status of testing interface 18; such status may specify, for example, that the last command sent to interface 18 is being executed or that testing interface 18 is ready to receive the next command. The chat flag, if set, allows a user at dispatch 20 to communicate with a user at telnet 22. The abort flag may be used to abort the execution of a script command. The telnet flag comprises an "on/off" flag which, if set to "on," allows another computer to access dispatch 20. The SOF flag is an "on/off" flag which can be used to stop the execution of a script command. The quit flag is used to terminate or quit out of the dispatch 20 program. In alternate embodiments, internal command information 74 of dispatch 20 may comprise information relating to other flags in addition to, or instead of, the exemplary flags described herein. Internal command information 74 may be maintained within internal command memory 56 in the form of one or more relational tables.

Testing interface command memory 58 contains testing interface command information 76. Testing interface command information 76 comprises information relating to various commands that may be sent to testing interface 18 in order to direct, instruct, control, or otherwise command the interface. These commands can include the internal commands and test developer commands associated with information contained in memories 38 and 40 of testing interface 18. Testing interface command information 76 can be maintained as one or more relational tables within testing interface command memory 58.

Script file memory 64 contains script file information 78. This script file information 78 comprises various information relating to one or more script files which are each associated with specific commands. Specifically, each script file may contain any one or a combination of commands for directing or controlling dispatch 20 and/or testing interface 18. Script file information 78 may include links or pointers to internal command information 74 and testing interface command information 76 stored in memories 56 and 58, respectively. Script file information 78 can be maintained in the form of one or more tables.

Help command memory 66 contains help command information 80. Help command information 80 supports an on-line help facility to provide immediate help to a user of testing system 10 at dispatch 20. Help command information 80 may comprise various information relating to one or more help commands. A help command, for example, may cause a list of valid command names to be displayed or presented to a user. Help command information 80 can be maintained as a file with one or more help topics, wherein each topic may have an associated record of information specific to that topic.

Command parser module 54 is coupled to internal command memory 56, testing interface command memory 58, script file memory 64, and help command memory 66. In addition, command parser module 54 is coupled to interface 50 via screen log memory 52. Command parser module 54 generally functions to analyze various commands or script files received at interface 50 and to parse or distribute these commands and script files as necessary for further processing. To accomplish this, command parser module 54 may access the information contained in memories 56, 58, 64, and 66. In one embodiment, command parser module 54 may include an interpreter which, for each command or script file received at interface 50, searches the relational tables in internal command memory 56, testing interface command memory 58, script file memory 64, and help command memory 66.

Internal command module 60 is coupled to interface 50, command parser module 54, internal command memory 56, script file memory 64, and help command memory 66. Internal command module 60 functions to receive internal commands, help commands, and script files parsed to it by command parser module 54. Internal command module 60 may interpret these commands and script files and, in response, invoke an appropriate function to process each internal command, help command, or script file. Internal command module 60 may retrieve internal command information 74, script file information 78, and help command information 80 from memories 56, 64, and 66, respectively, in order to execute the commands and script files. The operation of internal command module 60 may cause various flags associated with internal command information 74 to be set. Furthermore, this operation may cause help information to be presented at interface 50.

Testing interface command module 62 is coupled to command parser module 54 and testing interface command memory 58. Testing interface command module 62 receives and processes testing interface commands parsed by command parser module 54. In order to perform this processing, testing interface command module 62 may access the testing interface command information 76 contained in memory 58. The testing interface commands processed by testing interface command module 62 may be transmitted to testing interface 18 to direct, control, or otherwise command the interface's operation.

The functionality of each of command parser module 54, internal command module 60, and testing interface command module 62 may be performed by the same or separate processors, which can be any one or a combination of a main frame, file server, workstation, or any other suitable processor running appropriate software.

Command pending queue 68 is coupled to testing interface command module 62 and may communicate with testing interface 18, for example, over a testing interface network 82. Command pending queue 68 functions as a queue for the testing interface commands processed by testing interface command module 62. That is, command pending queue 68 holds the processed commands until testing interface 18 is ready to receive another command. At least a portion of the processed commands sent from command pending queue 68 may cause one or more test scripts 16 to be input into software application 12, which, in response, may output various test results.

Result capture memory 70 is coupled to testing interface network 82 and interface 50. Result capture memory 70 may reside in a suitable storage media, such as RAM, ROM, disk, tape storage, or other suitable volatile or non-volatile memory; this storage media can be the same or separate from the various storage media containing memories 52, 56, 58, 64, and 66. Result capture memory 70 functions to receive, store, and forward result capture information 84. Result capture information 84 may comprise various information relating to the test results that are output by testing interface 18 in response to one or more test scripts 16. These test results may be displayed or presented to a user at interface 50.

A flow chart for a method corresponding to an operation for dispatch 20 is illustrated and described below in more detail with reference to FIG. 5.

Figure 4:
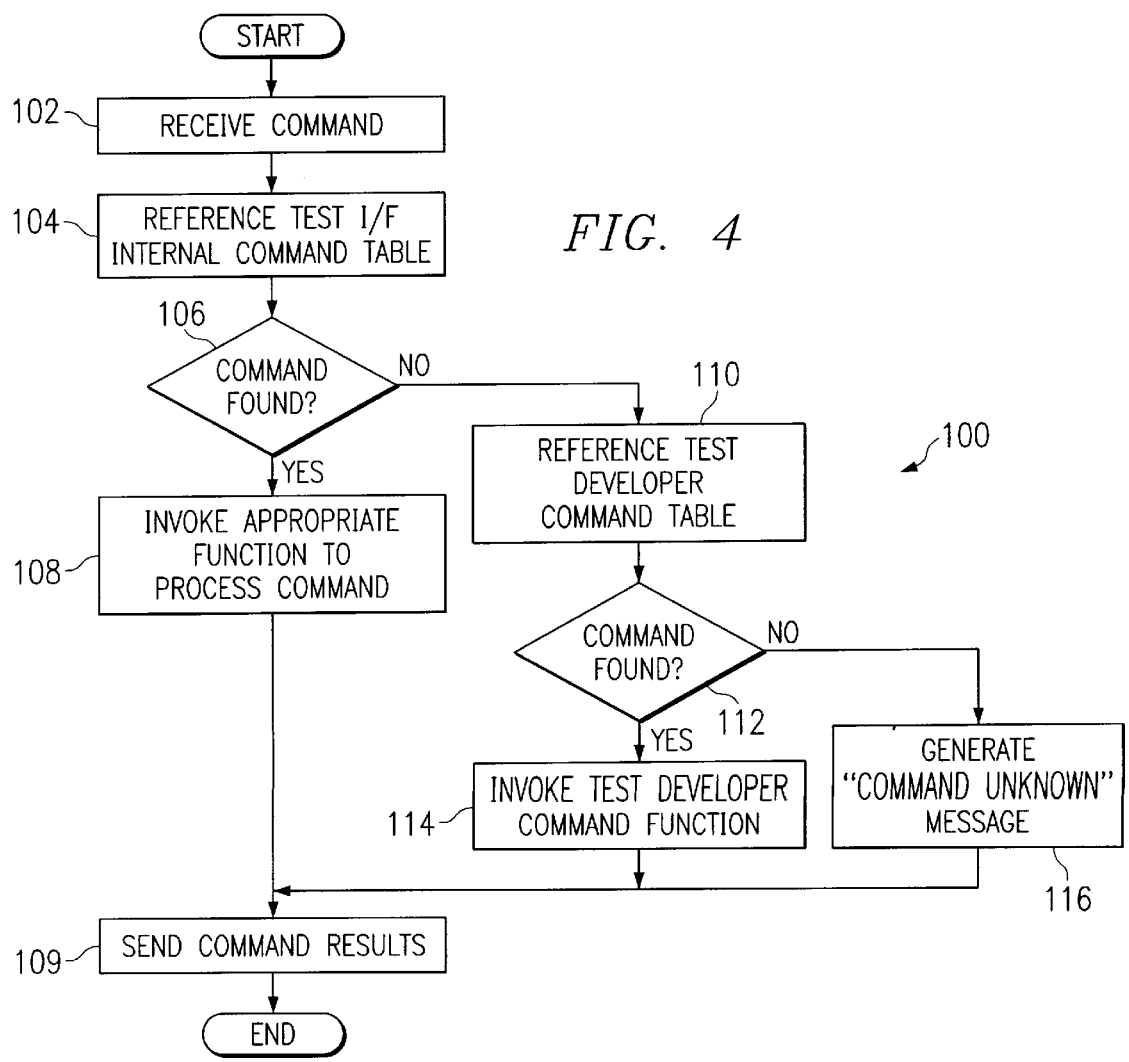
FIG. 4 is a flow chart of a method for processing a command at a testing interface, in accordance with an embodiment of the present invention.

FIG. 4 is a flow chart of an exemplary method 100 for processing a command at testing interface 18, in accordance with an embodiment of the present invention. Testing interface 18 may reside on hardware component 14 and supports interactive and/or automated testing of software application 12 also resident on hardware component 14.

Method 100 begins at step 102 where testing interface 18 may receive, via interface network 42, a command at command parser module 32. Such command may originate from dispatch 20 or telnet 22, and can be an internal command or a test developer command which control, instructs, directs, or otherwise commands testing interface 18.

At step 104, command parser module 32 references the internal command table which can be maintained within internal command memory 38. Command parser module 32 then searches this internal command table for internal command information 44 related to the received command. In one embodiment, this search may be performed by an interpreter of command parser module 32.

At step 106, a determination is made whether internal command information 44 for the received command was found in the internal command table. If such information for the command was found, the received command comprises an internal command which, for example, may set or reset a corresponding flag in testing interface 18. Command parser module 32 parses or distributes the internal command to internal command module 34. At step 108, internal command module 34 invokes an appropriate function to process the internal command. Results of the internal command are returned or sent to dispatch 20 or telnet 22 at step 109, after which, method 100 ends.

Otherwise, if it is determined at step 106 that the received command was not found within the internal command table of memory 38, command parser module 32 accesses the test developer command memory 40 and references the test developer command table contained therein at step 110. The command parser module 32 then searches the test developer command table for test developer command information 46 related to the command.

At step 112, command parser module 32 determines whether test developer command information 46 for the received command was found in the test developer command table. If such information for the command was found, the command comprises a test developer command which may, for example, be used to input one or more test scripts 16 into software application 12. Command parser module 32 distributes the test developer command to test developer command module 36. At step 114, test developer command module 36 invokes the test developer command function corresponding to the received command. Results of the test developer command are returned or sent to dispatch 20 or telnet 22 at step 109, after which, method 100 ends.

Alternatively, if at step 112 test developer command information for the received command was not found within the test developer command table, then command parser module 32 generates a "command unknown" message at step 116. The "command unknown" message can be relayed back to a dispatch 20, via user interface network 42, in order to alert a user that the command entered by the user at dispatch 20 is a non-functional command. Method 100 then ends.

Figure 5A:
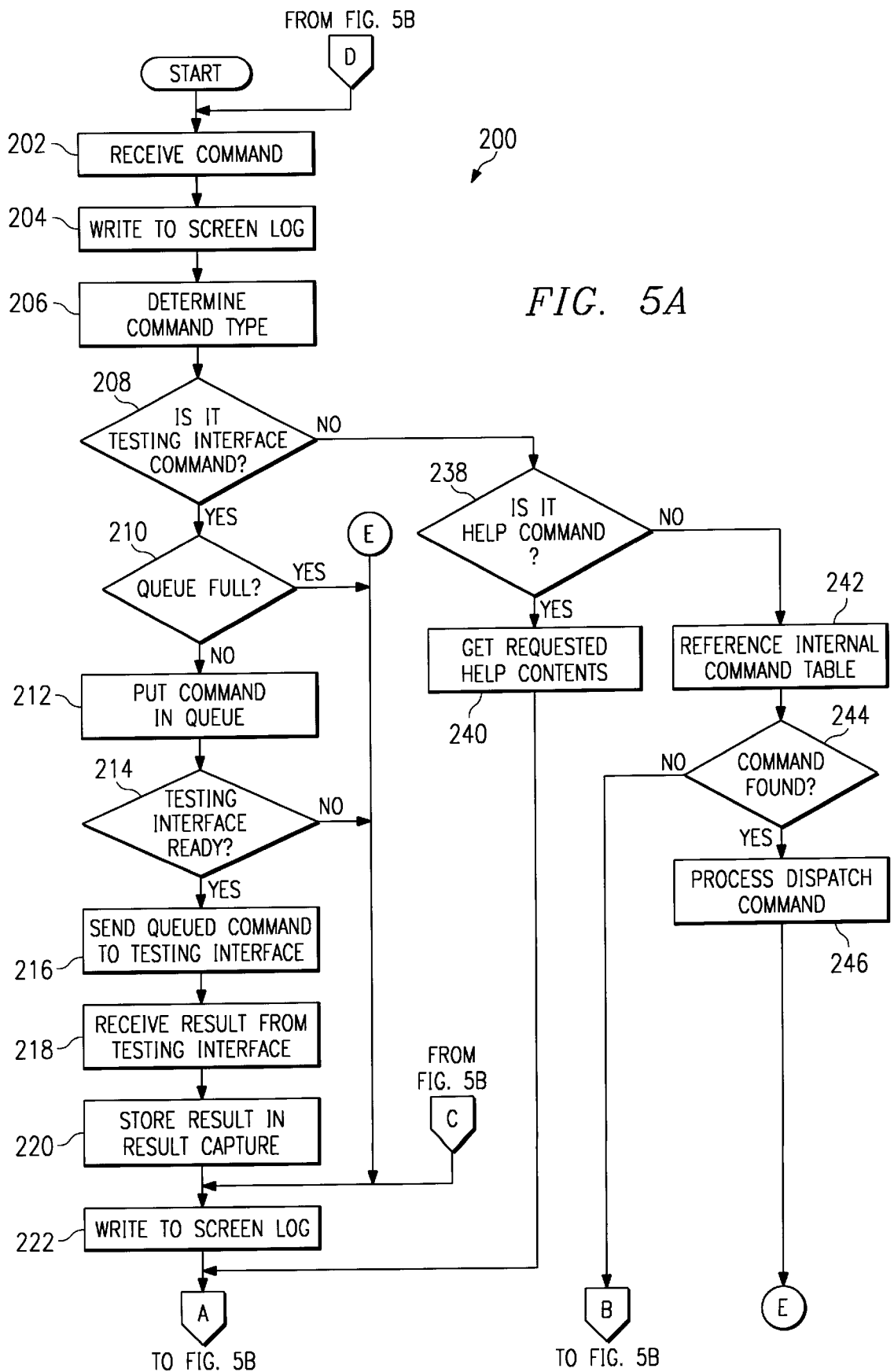
FIG. 5 is a flow chart of a method for processing a command at a dispatch, in accordance with an embodiment of the present invention.
Figure 5B:
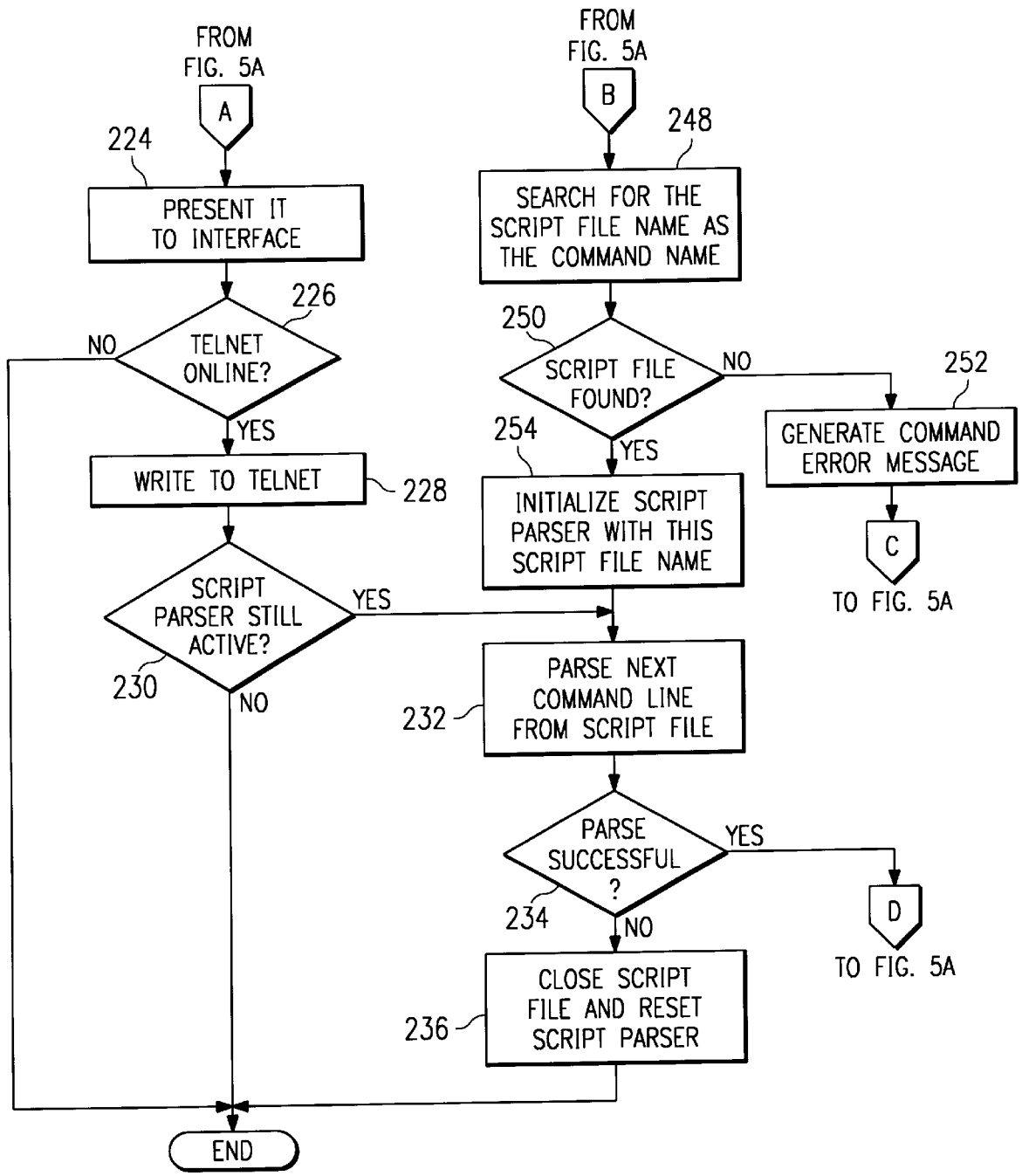

FIG. 5 is flow chart of a method 200 for processing a command at dispatch 20, in accordance with an embodiment of the present invention. Dispatch 20 may reside on a computer 24 and supports interaction between testing interface 18 and a user.

Method 200 begins at step 202, where dispatch 20 receives a command. Such command may originate from a user entering the command at interface 50, or alternatively, from telnet 22 or from testing interface 18. At step 204, the received command is written or stored into screen log memory 52 as screen log information 72. The command is then forwarded to command parser module 54.

Command parser module 54 may access one or more of internal command memory 56, testing interface command memory 58, and help command memory 66 to reference any appropriate command tables contained therein. Command parser module 54 searches the command tables for information—e.g., internal command information 74, testing interface command information 76, or help command information 80—related to the received command. In one embodiment, command parser module 54 may comprise an interpreter which performs this searching.

At step 206, command parser module 54 determines the type of the command. If the command is a testing interface command, as determined at step 208, it is routed to testing interface command module 62. Testing interface commands generally provide instruction or direction to testing interface 18. These testing interface commands can be used, for example, to control the internal operation of testing interface 18 or, alternatively, to invoke test scripts 16 for input into software application 12. At step 210, testing interface command module 62 determines whether command pending queue 68 is full. If command pending queue 68 is full, the command cannot be accepted into the queue, and method 200 proceeds to step 222 where a message conveying this fact is written to screen log memory 52. Alternatively, if queue 68 is not full, then at step 212 testing interface command module 62 places the command into the queue for transmission to testing interface 18.

At step 214, a determination is made whether testing interface 18 is ready for another command. In one embodiment, testing interface 18 may operate on one command at a time; in other embodiments, testing interface 18 may be capable of operating on multiple commands at the same time. If testing interface 18 is not ready for the next command, method 200 moves to step 222 where a suitable message is written to screen log memory 52. Otherwise, if testing interface 18 is ready, command pending queue 68 sends the next testing interface command to testing interface 18 via testing interface network 82 at step 216.

At least a portion of the testing interface commands transmitted to testing interface 18 may cause the interface to input one or more test scripts 16 into software application 12 which, in response, may generate various results. These results are returned to testing interface 18. Testing interface 18 may also generate its own results in response to some of the testing interface commands that it receives from dispatch 20. Testing interface 18 may transmit these results to dispatch 20. At step 218, dispatch 20 receives the results from testing interface 18 via testing interface network 82. The received results are stored into result capture memory 70 as result capture information 84 at step 220.

At step 222, the result capture information 84 is written to screen log memory 52. The information written into screen log memory 52 is then displayed or presented to a user at interface 50 at step 224. At step 226, a determination is made whether telnet 22 is on-line or in communication with dispatch 20. If telnet 22 is not on-line, method 200 ends. Alternatively, if telnet 22 is on-line, the information written into screen log memory 52 (which may include result information) is transmitted and written to telnet 22 at step 228.

In one embodiment, the transmission of results from testing interface 18 and their subsequent display to a user at dispatch 20 may occur on a result-by-result basis. That is, after each result is generated at testing interface 18, it is separately transmitted to and displayed at dispatch 20. Thus, the present invention may provide substantially real-time display of testing results output by software application 12, thereby facilitating the monitoring of testing by a user.

At step 230, a determination is made whether the script parser is still active. This script parser supports the internal operation of dispatch 20. The functionality of the script parser may be provided, at least in part, by one or a combination of internal command memory 56, internal command module 60, and script file memory 64. If the script parser is no longer active, method 200 ends. Otherwise, if the script parser is still active, then at step 232 a command from a script file stored in script file memory 64 is parsed to internal command module 60. It is determined at step 234 whether the parse was successful. If the parse was successful, method 200 returns to step 202. Alternatively, if the parse was not successful, the script file is closed and the script parser is reset at step 236; method 200 then ends.

Returning again to step 208, if it is determined that the received command is not a testing interface command, then at step 238 command parser module 54 determines whether the command is a help command. A help command supports an on-line help facility which provides assistance to users of testing system 10. If the received command is a help command, at step 240 the requested help information is retrieved from help command memory 80, after which method 200 moves to step 224 where this information is presented to a user at interface 50. Alternatively, if the received command is not a help command, then command parser module 54 references the internal command table at step 242.

At step 244, it is determined whether information relating to the command is found in the internal command table. If such information is found in the internal command table, the command is an internal command which can be parsed or routed to internal command module 60. An internal command, for example, can be used to set or reset various flags internal to dispatch 20. At step 246, internal command module 60 processes the command, for example, by invoking an appropriate function. Information relating to the processing of the internal command is written into screen log memory 52 at step 222.

Referring again to step 244, if it is determined that information relating to the received command is not found in the internal command table, then at step 248 command parser module 54 searches script file memory 64 for a script file having the name of the received command. At step 250, a determination is made whether a script file having the name of the received command has been found in script file memory 64. If no such script file was found, command parser 54 generates a command error message at step 252; method 200 then proceeds to step 222 where this command error message is written into screen log memory 52. Alternatively, if a script file having the name of the command was found in script file memory 64, then at step 254 the script parser is initialized with the script file name. Method 200 then moves to step 232 where the next command is parsed from the script file.

Although the present invention and its advantages have been described in detail, it should be understood that various changes, substitutions, and alterations can be made therein without departing from the spirit and scope of the invention as defined by the appended claims.

What is claimed is:

1. A system for testing a software application residing on a hardware component, the system comprising:
    at least one test script for testing a function of the software application;
    a testing interface operable to be loaded into the hardware component, the testing interface operable to input the test script into the software application, wherein the hardware component does not have direct interaction with a user; and
    a dispatch in communication with the testing interface, the dispatch operable to receive a command from the user and, in response, to invoke the input of the test script into the software application using the testing interface.

2. The system of claim 1, wherein the dispatch comprises a program residing on a computer coupled to the hardware component.

3. The system of claim 1, wherein the dispatch comprises a command/response type of program.

4. The system of claim 1, wherein the dispatch comprises an interface operable to present information to the user.

5. The system of claim 1, wherein the dispatch comprises a result capture memory operable to store test results generated by the software application in response to the test script.

6. The system of claim 1, further comprising a telnet in communication with the dispatch, the telnet comprising a program residing on a computer remote from the hardware component, the telnet operable to support remote testing of the software application.

7. The system of claim 1, wherein the testing interface is operable to receive test results from the software application and to relay the test results to the dispatch for presentation to the user.

8. A system for testing a software application residing on a hardware component, the system comprising:
    at least one test script for testing a function of the software application;
    a testing interface operable to be loaded into the hardware component, the testing interface operable to input the test script into the software application; and
    a dispatch in communication with the testing interface, the dispatch operable to receive a command from a user and, in response, to invoke the input of the test script into the software application using the testing interface, wherein the dispatch comprises:
        an internal command module operable to process an internal command;
        a testing interface command module operable to process a testing interface command; and
        a command parser module coupled to the internal command module and the testing interface command module, the command parser module operable to receive the command from a user, to determine whether the command is either an internal command or a testing interface command, and to parse the command to either the internal command module or the testing interface command module for processing.

9. The system of claim 8, wherein the dispatch comprises a queue coupled to the testing interface command module, the queue operable to receive a processed testing interface command from the testing interface command module and to transmit the processed testing interface command to the testing interface.

10. The system of claim 8, wherein the internal command module is further operable to receive and process a help command.

11. A system for testing a software application residing on a hardware component, the system comprising:
    at least one test script for testing a function of the software application;
    a testing interface operable to be loaded into the hardware component, the testing interface operable to input the test script into the software application; and
    a dispatch in communication with the testing interface, the dispatch operable to receive a command from a user and, in response, to invoke the input of the test script into the software application using the testing interface, wherein the testing interface comprises:
        an internal command module operable to process an internal command;
        a test developer command module operable to process a test developer command; and
        a command parser module coupled to the internal command module and the test developer command module, the command parser module operable to receive the command from a user, to determine whether the command is either an internal command or a test developer command, and to parse the command to either the internal command module or the test developer command module for processing.

12. A testing interface for testing a software application residing on a hardware component, the testing interface operable to be loaded into the hardware component, the testing interface comprising:
    an internal command module operable to process an internal command;
    a test developer command module operable to process a test developer command; and
    a command parser module coupled to the internal command module and the test developer command module, the command parser module operable to receive a command from a user, to determine whether the command is either an internal command or a test developer command, and to parse the command to either the internal command module or the test developer command module for processing.

13. The testing interface of claim 12, further comprising:
    an internal command memory coupled to the command parser module, the internal command memory operable to store internal command information; and
    a test developer command memory coupled to the command parser module, the test developer command memory operable to store test developer command information.

14. The testing interface of claim 13, wherein the command parser module is operable to reference the internal command information and the test developer command information in order to determine whether a received command is either an internal command or a test developer command.

15. A method for testing a software application residing on a hardware component, the method comprising the steps of:

receiving a command from a user at a dispatch residing on a computer coupled to the hardware component, the hardware component not having a direct interaction capability with the user;

transmitting the command to a testing interface which has been loaded into the hardware component; and in response to the command, invoking the input of a test script into the software application, the test script for testing a function of the software application.

16. The method of claim 15, further comprising the step of determining whether the command is an internal command or a testing interface command.

17. The method of claim 15, further comprising the steps of:

receiving, at the testing interface, test results from the software application; and relaying the test results to the dispatch for presentation to the user.

18. The method of claim 15, further comprising the step of queuing the command before the command is transmitted to the testing interface.

19. The method of claim 15, further comprising the step of connecting the testing interface to a telnet.

20. The method of claim 15, further comprising the step of referencing at least one memory in order to identify the command.

* * * * *